June 11, 1963  E. L. SCHEIDENHELM  3,093,229
BOX HANDLING APPARATUS

Filed Jan. 23, 1961  5 Sheets-Sheet 1

INVENTOR.
Earl L. Scheidenhelm
BY Wells & St. John
attys.

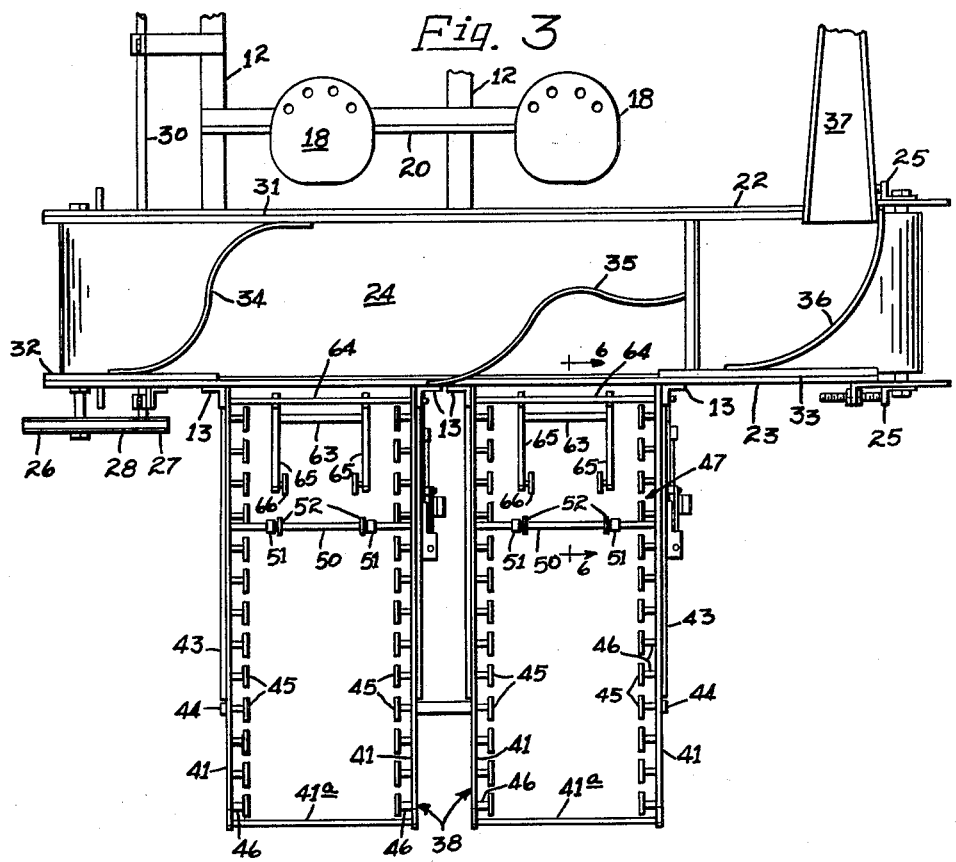

INVENTOR.
Earl L. Scheidenhelm
BY Wills & St. John
Attys.

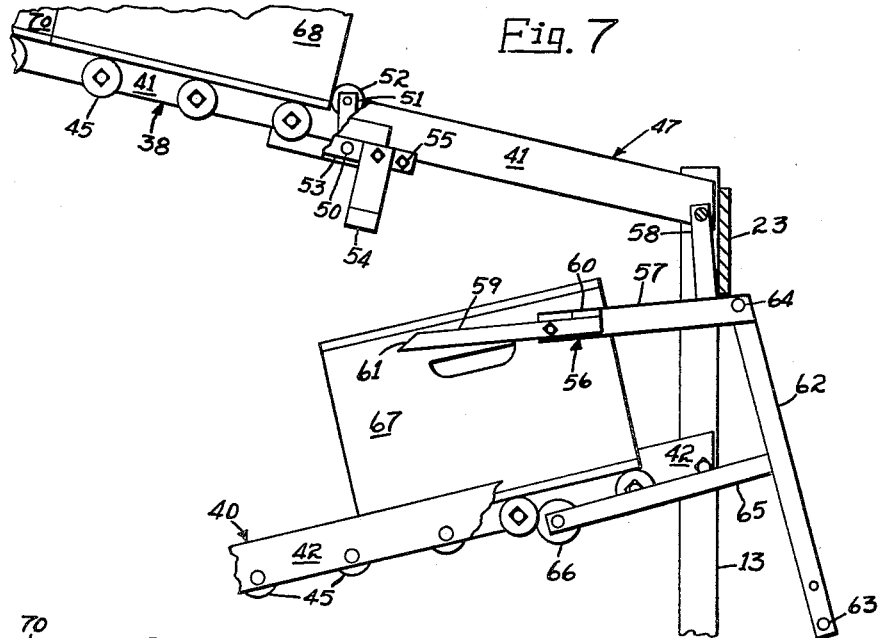
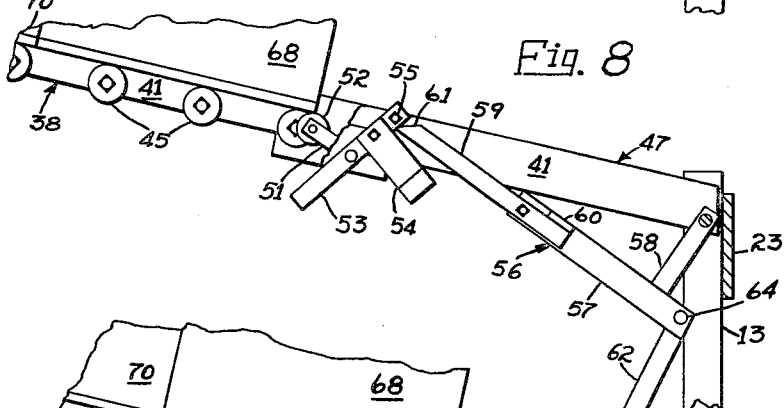
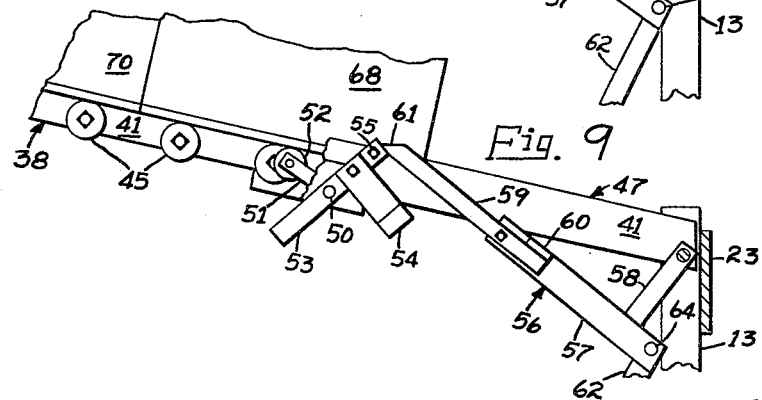

June 11, 1963  E. L. SCHEIDENHELM  3,093,229
BOX HANDLING APPARATUS
Filed Jan. 23, 1961  5 Sheets-Sheet 5
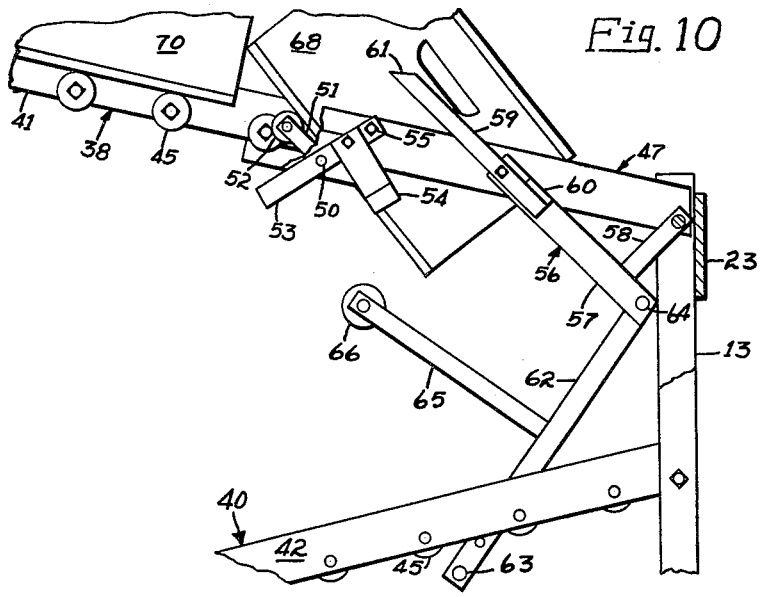
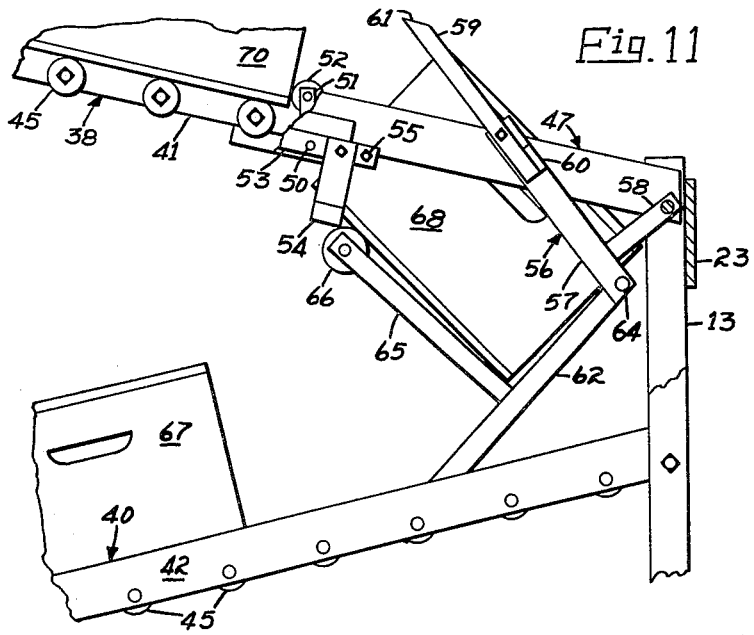
INVENTOR.
Earl L. Scheidenhelm
BY Wells & St. John
Attys.

United States Patent Office 3,093,229
Patented June 11, 1963

3,093,229
BOX HANDLING APPARATUS
Earl L. Scheidenhelm, Mendota, Ill., assignor to
Horace D. Hume, Mendota, Ill.
Filed Jan. 23, 1961, Ser. No. 84,177
1 Claim. (Cl. 193—36)

This application relates to a novel box handling apparatus particularly designed for use on mobile harvesting equipment.

The present invention is designed for use on a farm harvester. In such a machine a complete mobile unit is desirable. It must consist of a harvesting assembly, a separator assembly to remove the fruit or crop from the supporting vine and finally a box handling assembly wherein the fruit is packed in bulk for later preparation. According to the present invention a very simple crop loading and box handling assembly is provided at the rear of such a harvesting unit. This assembly is designed to facilitate both the sorting and loading of bulk crops.

It is the first object of this invention to provide a mobile box handling unit which can be operated by a person sorting newly harvested fruit without requiring the use of the person's hands. In order to fulfill this object the present invention was designed to be controlled by a single foot pedal which can be operated by the sorter independently of his manual sorting operations.

It is a second object of this invention to provide such a foot controlled box handling apparatus which will automatically feed single boxes to the sorting and loading area for use by the sorter. The present invention contemplates the use of movable stops to control box motion and movable supports for the box during loading, these two units being interrelated in order to insure that the boxes are supplied singly to the person doing the sorting.

In general the present invention contemplates the use of an upper conveyor and lower conveyor, the first being slanted downwardly toward a loading position and the second slanted downwardly away from the loading position and the two being in vertical alignment with one another. Means is provided to allow passage of a single box from the first conveyor to the second conveyor under the sole influence of gravity. The movement of the boxes from the first conveyor to the second conveyor is controlled by the operator or sorter by using a foot pedal arrangement which interrelates the feeding of boxes from one conveyor to the other and the angular positioning of each box while it is being loaded. The top conveyor is adapted to receive empty boxes from persons located on a trailer following the harvesting machine. These persons will in turn remove filled boxes from the outer end of the lower conveyor, thereby completing the steps necessary for bulk loading.

The above objects will be more definitely understood from a study of the following description and the accompanying drawings which show one complete embodiment of the invention. This embodiment is merely exemplary and is not intended to limit the scope of the present invention except as the scope is defined in the claim which follows.

In the drawings:

FIGURE 3 is a top view of the box handling assembly with the supporting framework broken off at the harvesting machine;

FIGURE 4 is an enlarged detailed view of one side of the top conveyor showing the control assembly, with portions of the supporting framework being broken away for clarity;

FIGURES 7–11 illustrate the operation of the box handling apparatus and constitute side views similar to FIGURE 1 but are drawn to an enlarged scale with portions of the supporting framework and conveyors being broken away for clarity;

FIGURE 7 shows a box being deposited upon the lower conveyor;

FIGURE 8 shows the operation of the control assembly as it tilts the stop members to release the next box on the upper conveyor;

FIGURE 9 shows the movement of the control assembly to release the stop members while allowing the box to roll over the stop members;

FIGURE 10 shows a box tilting downwardly and falling upon the support arms; and

FIGURE 11 shows the box in its final loaded position, the next box being halted by the stop members on the first conveyor.

Figure 1:
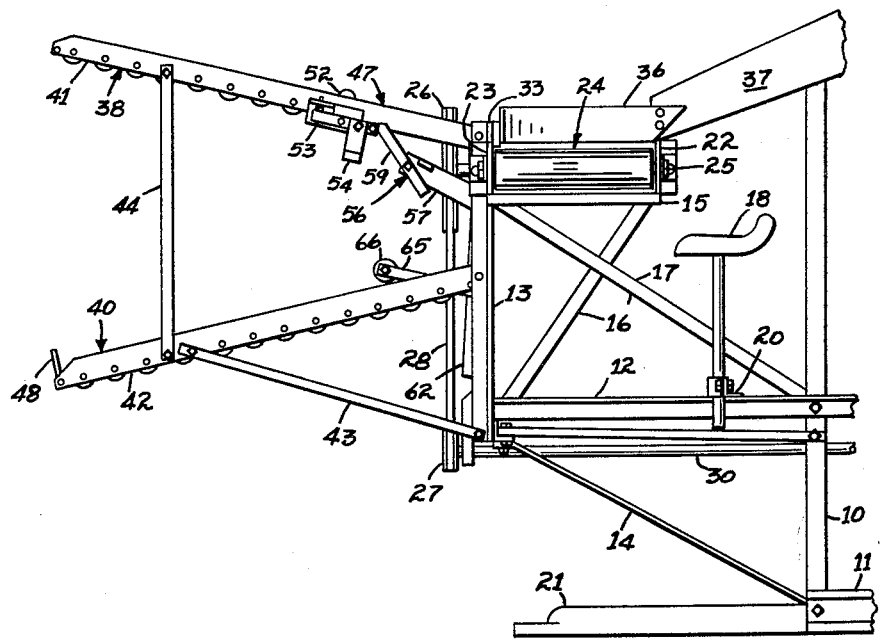
FIGURE 1 is a side view of the box handling apparatus with the supporting framework being broken away at the harvesting machine.

Referring now to the drawings, there is shown a box handling and fruit sorting apparatus designed specifically for use on the mobile frame of a harvesting machine such as the tomato harvester shown fully in my co-pending application noted above. The sorting and handling apparatus shown in the drawings accompanying this description may be used on any suitable mobile frame and may be carried in any suitable fashion. In addition, this apparatus could also be used with equal efficiency on a stationary framework. Although designed primarily with mobile installation in mind the instant invention is equally applicable to a stationary installation.

Figure 2:
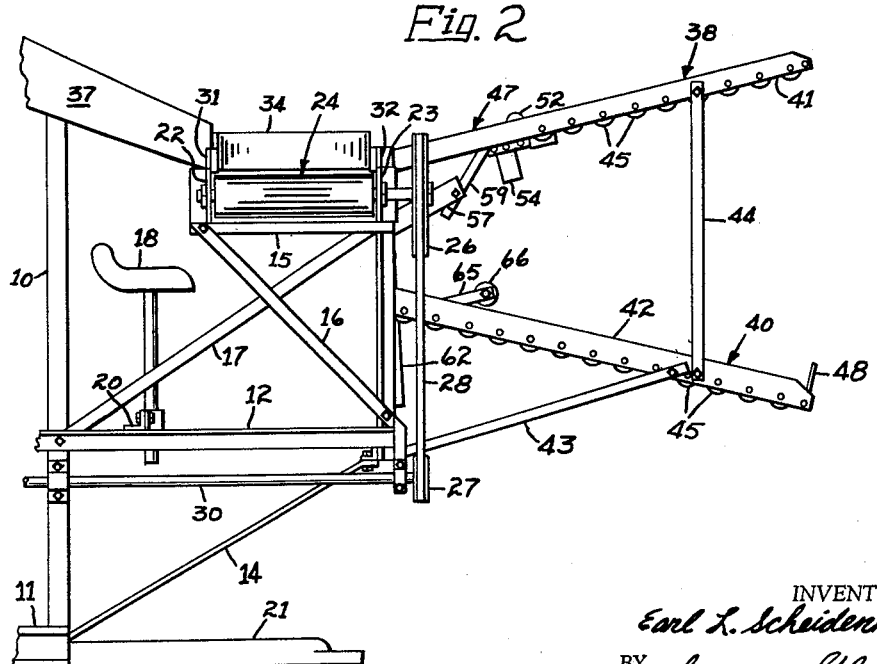
FIGURE 2 is a side view taken opposite to that seen in FIGURE 1.
Figure 5:
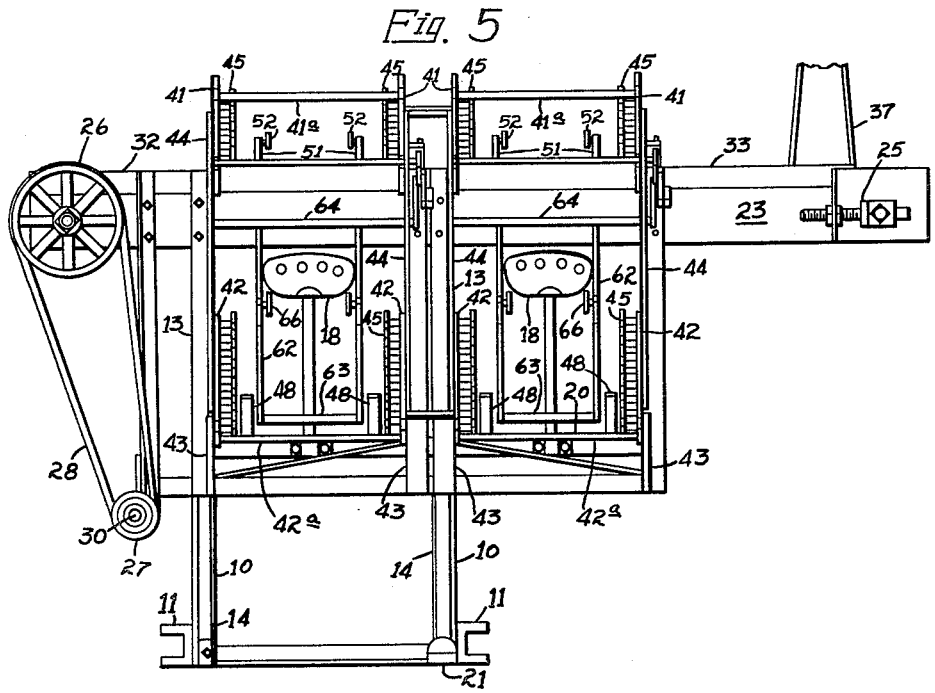
FIGURE 5 is an end of the assembly as seen in FIGURES 1–3.

The basic supporting framework for the box loading apparatus consists of a pair of vertical struts 10 which are rigidly fixed to a supporting member 11 which in turn is fixed to the tractor frame or other mobile supporting structure. Fixed to each of these struts 10 is one of a pair of horizontal braces 12 which extend to the mobile frame. At the outer ends of the supporting members 11 are fixed vertical table supports 13 which are braced by diagonal braces 14. The vertical table supports 13 in turn are fixed to horizontal table braces 15 which are supported by cross members 16 and diagonal braces 17. Thus the framework is a rigid structure consisting of the elements 10–17 and provides a cantilevered structure which may be supported on the mobile framework at the rear thereof. This framework also enables a table structure to be supported on the horizontal table braces 15 with unobstructed leg room for the persons sitting in the seats 18 provided along an angle iron 20 supported rigidly between the horizontal braces 12. It is upon the two seats 18 that the sorters sit during the packing operation. At the lower portion of FIGURES 1 and 2 is seen a rearwardly extending trailer hitch 21 which is used to draw the trailer upon which the filled and empty boxes are placed during the packing operation. Such hitches are well known in this art and will not be further described herein.

Mounted across the tops of the horizontal table braces 15 are a pair of spaced side plates 22 and 23. These side plates rotatably support a pair of conveyor rollers which in turn support a conventional endless conveyor designated by the numeral 24. The customary means 25 are provided to take up slack in the conveyor 24. The conveyor 24 is driven by a large pulley 26 at the discharge end thereof. Pulley 26 in turn is driven by a smaller pulley 27 and a belt 28. The pulley 27 is fixed upon a drive shaft 30 which extends forwardly to any suitable drive mechanism, such as a power take off assembly.

The conveyor 24 is suitably bounded above its top surface by a longitudinal plate 31 at the front edge thereof and by a pair of partial longitudinal plates 32 and 33 along the rear edge thereof. These plates 32 and 33 leave open the loading areas utilized by the two sorters. The conveyor is further provided with curved dividers 34, 35 and 36. The divider 34 is designed to define the limit of the conveyor 24 and to guide fruit toward the second loading and sorting area. The divider 35 extends half way across the conveyor 24 and is designed to guide approximately half of the incoming produce toward the first sorting position. The divider 36 is an incoming guide for the fruit. Adjacent the guide 36 is a feed conveyor 37 which may be of any conventional type. The conveyor 37 may be a driven belt or may simply be a slide or any other suitable mechanism.

The accompanying drawings show a box handling apparatus made according to the present invention having two loading areas, each of which is basically identical to the other. Since the box handling mechanisms at these loading areas are identical to one another, only one such mechanism will be described, although identical numbers will be used to designate corresponding parts of each mechanism on the accompanying drawings.

Basically the box handling mechanism consists of an upper conveyor 38, and a lower conveyor 40. Each of these conveyors 38 and 40 extends rearwardly from the supporting framework and outwardly from the mobile frame or other supporting vehicle. The upper conveyor 38 extends outwardly at an acute angle above the horizontal while the lower conveyor 40 extends outwardly at an acute angle below the horizontal. The upper conveyor 38 has a pair of side plates 41 which are parallel to one another and spaced transversely along the length of conveyor 24. The two plates 41 are respectively secured in fixed positions to adjacent vertical table braces 13 in the supporting framework. The lower conveyor 40 is provided with a pair of spaced plates 42 which are also parallel to one another and spaced transversely along the length of conveyor 24. The two plates 42 are similarly secured to adjacent vertical table supports 13 at a position below the lower level of the conveyor 38. The two conveyors 38 and 40 are vertically one above the other. The lower conveyor 40 is further supported by a pair of braces 43 extending outwardly from the support framework. The upper conveyor 38 is supported near its outboard end by a pair of vertical braces 44 which in turn are secured to the side plates 42 of conveyor 40. The outer ends of plates 41 and 42 are joined by end rods 41a and 42a respectively. Thus no further rigid supporting framework is necessary below the elevation of the conveyor 40.

Each of the conveyors 38 and 40 is of the gravity type, having no power to move objects placed thereon. They utilize double rows of spaced rollers 45 which are rotatably mounted on stub shafts 46. The stub shafts 46 are carried by the side plates 41 or 42. Thus the central portion of each conveyor is left open. The rollers 45 in the upper conveyor 38 extend from the outboard end of the conveyor 38 to an open area generally designated by numeral 47. The open area 47 has a width between the lowest roller 45 and the conveyor assembly 24 sufficient to allow a box on the upper conveyor 38 to fall through this open area 47 onto the lower conveyor 40. Lower conveyor 40 utilizes the same rollers 45 and is a continuous conveyor having rollers 45 positioned from the area adjacent the supporting framework to its outboard. A pair of plates 48 are fixed to end rod 42a. The plates 48 prevent filled boxes from falling off the outboard end of conveyor 40.

In operation, empty boxes will be placed on the outboard end of conveyor 38 and will be allowed to move by their own weight down the conveyor. Boxes falling through the open area 47 and placed upon the conveyor 40 will be filled with produce and in turn will roll by their own weight until they contact the stops 48 and are removed from the conveyor 40.

Figure 6:
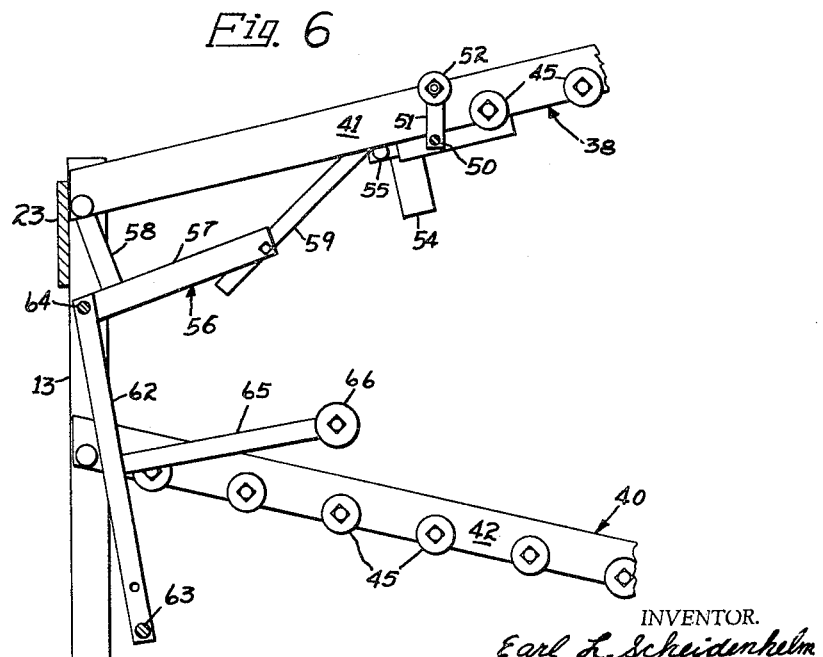
FIGURE 6 is an enlarged sectional view of the controls and support assemblies as seen along line 6—6 in FIGURE 3.

In order to control movement of boxes through the open area 47, it is necessary to provide a stop mechanism on the upper conveyor 38. The stop mechanism utilized herein consists of a shaft 50 which is rotatably journalled between the side plates 41 and which extends outwardly beyond the side plate 41 at the right hand side seen in FIGURE 3. The shaft 50 has fixed thereon a pair of radial arms 51 which have rotatably mounted at their outer ends a pair of stop rollers 52. The stop rollers 52 are located intermediate the side plates 41 and within the path of boxes rolling downward along the rollers 45 on conveyor 38. The stop rollers 52 are movable about the axis of shaft 50 from a first position shown in FIGURES 1, 2 and 6 wherein the rollers 52 block movement of boxes rolling along the rollers 45, to a second position shown in FIGURES 8 and 9 wherein the rollers 52 are at the same elevation as rollers 45 and thereby allow boxes to roll over them. In order to effect this movement, a lever 53 is fixed to the outer end of shaft 50, as can best be seen in the enlarged FIGURES 7–11. This lever 53 is spaced from the adjacent side plate 41. It carries a counterweight element 54 which is fixed to the lever 53. The counterweight 54 is approximately opposite to the rollers 52 with respect to the axis of shaft 50. Also mounted on the lever 53, at the same side of shaft 50 as counterweight 54, is a roller element 55, which faces the adjacent side plates 41. This roller element 55 is the element used to pivot member 53 about the axis of shaft 50.

The control mechanism by which shaft 50 is actually pivoted consists of a divided arm 56 which has a first element 57 fixed to a crank arm 58. Crank arm 58 is pivoted to the vertical brace 13 and the lowermost end of the side plate 41. Pivoted to the element 57 is a second element 59 which extends outwardly. Element 59 is sufficiently long to insure contact with the roller element 55. The element 57 also has a fixed ledge 60 fixed thereon adapted to abut the inner end of the element 59. The outer end of the element 59 has formed thereon a diagonal cam surface 61 which is adapted to abut the surface of roller element 55. The length of the element 59 is such that the outer end of the cam surface 61 will slip past the roller element 55 and upward just as the rollers 52 reach a position at the elevation of rollers 45.

In order to prevent tipping of the boxes as they fall through the open area 47 it is necessary to provide a movable support below the open area 47. This support is incorporated with the control arm 56. The support consists of a brace 62 which extends downwardly from the inboard end of the element 57 and which is fixed relative thereto. Although the control arm 56 is located at only one side of the conveyors 38 and 40, the crank arm 58 and a portion of the element 57 joining the crank arm 58 and the arm 62 are provided at each side of the conveyor 38. At the lower end of the arm 62 is journalled a rod 63 which serves as a foot pedal. Joining the upper end of the arms 62 is a fixed rod 64 which serves to insure a rigid pedal structure. Intermediate the two rods 63 and 64 the arms 62 are provided with a pair of support arms 65 which are perpendicular to the arms 62. At the outboard end of the arms 65 are rotatably mounted a pair of rollers 66. The length of the arms 65 is sufficient to insure proper seating of a box on the arms 65 abutting the arms 62 without danger of the boxes tilting over the rollers 66.

The operational sequence of the controls just described can best be seen by a study of FIGURES 7–11. As seen in FIGURE 7, the loaded box 67 is being released on the lower conveyor 40 and will ride down the rollers 45 until it hits the stops 48 and is removed by a person at the outboard end of the apparatus. This release is accomplished by the use of the pedal 63 held by the sorter's foot and pulled in a counterclockwise direction as seen in FIGURES 7-11. The pedal 63 is pulled rearwardly by the sorter until the rollers 66 fall below the level of rollers 45 in conveyor 40. At this time the arm 56 hangs free and the stop rollers 52 are in the path of the next box, which is designated by the numeral 68. As soon as the box 67 clears the rollers 66 the sorter pushes his foot forward, thereby moving pedal 63 in a clockwise direction. This movement is continued until the cam surface 61 on element 59 contacts the roller element 55 on lever 53. At this moment the continued clockwise movement of the pedal 63 results in counterclockwise rotation of the lever 53 about the axis of shaft 50. This forces the rollers 52 to assume a similar counterclockwise motion about the axis of shaft 50 and to push back upon box 68 until the rollers 52 attain the position shown in FIGURE 8 wherein they lie at the elevation of rollers 45 on conveyor 38.

At this point the box 68 is free to move, having been jostled by the backward movement of the rollers 52. The box 68 will then roll forward as seen in FIGURE 9 and the continued movement of pedal 63 will force the cam surface 61 to slip over the roller element 55 thereby releasing lever 53. The position at which the box 68 is caught by the arms 65 is shown best in FIGURES 10 and 11. In FIGURE 10 the box is tilted on the rollers 52 which are beinning to move in a clockwise direction under the influence of the counterweight 54. As the weight of box 68 is lessened, rollers 52 bear upwardly against its bottom surface. The rollers 52 then act to prevent movement of the next box 70 into the open area 47. The box 68 is shown resting upon the arms 65 in FIGURE 11 and the box 70 is effectively stopped in its downward travel along conveyor 38. The box 68 may be held in any convenient angular position for packing purposes, as may be desired by the sorter. When the box 68 is to be deposited upon the lower conveyor 40 the sorter will again pull back upon pedal 63 and will cause the arm 56 to jack knife in the manner seen in FIGURE 4. As the lower surface of element 59 rides over the roller element 55, the element 59 is allowed to pivot with respect to element 57, thereby resetting the entire apparatus for a recycling of the operation seen in FIGURES 7-11.

The above invention provides an effective box handling mechanism which can be operated by a single person in conjunction with his sorting duties. The mechanism requires no manual adjustment or control, being entirely controlled by the feet of the sorter. The mechanism is easily managed and requires no lifting of loaded or unloaded boxes by the sorter. It effectively insures singular feeding of each box to the sorting area and provides a systematic conveyor system for the feeding and unloading of the box of the mobile harvesting machine.

Although the above embodiment is particularly designed for harvesters, other modifications may be possible within the purview of this invention. For this reason the scope of this invention is not to be limited except as it is limited by the claims which follow.

Having thus described my invention, I claim:

A box handling apparatus for bulk produce, comprising:
   a support framework;
   a sorting table mounted on said framework;
   a first box supporting gravity conveyor mounted on said framework extending perpendicularly from a location adjacent one edge of said table at an acute upward angle with respect to the horizontal;
   a second box supporting gravity conveyor mounted on said framework extending perpendicularly from a lower location adjacent said one edge of said table at an acute downward angle with respect to the horizontal, said first and second conveyors being vertically aligned with one another and said first conveyor having an open area directly adjacent said table through which a single box on said first conveyor may be transferred to said second conveyor;
   movable stop means mounted on said first conveyor in the path of boxes thereon and adjacent to said open area adapted to selectively prevent movement of boxes to said open area;
   movable box support means mounted on said framework directly below said open area adapted to transfer boxes from said first conveyor to said second conveyor, said movable box support means comprising a pair of outwardly extending support arms located intermediate the sides of said first and second conveyors;
   and control means comprising a rigid supporting assembly fixed to said arms at their ends nearest the framework, said assembly extending above said arms and being pivoted about a horizontal transverse axis on said framework adjacent said first conveyor;
   a control arm mounted on said assembly adjacent one outer side of said first conveyor, said control arm including a first link fixed to said assembly, a second link pivoted thereto, and a stop on said first link adapted to limit pivotal movement of said second link in one direction of rotation about its pivot;
   said movable stop means comprising a transverse shaft rotatably mounted between the sides of said first conveyor adjacent said open area;
   radial abutments fixed to said transverse shaft intermediate the conveyor sides and extending from the shaft in a single radial direction;
   and lever means fixed to said shaft adjacent said one outer side of said first conveyor, said lever means including a counterweight fixed thereon adapted to urge said radial abutments to an upwardly extending vertical position, said lever means having a portion positioned in the path of said control arm adapted to be abutted by the outer end of said second link to thereby raise said counterweight and pivot said shaft;
   said second link having a cam surface at the end thereof adapted to abut said lever means to thereby pivot said shaft and adapted to release said lever means after said radial abutments have been moved below the elevation of boxes on said first conveyor.

References Cited in the file of this patent

UNITED STATES PATENTS

| | | |
|---|---|---|
| 1,295,195 | Parker | Feb. 25, 1919 |
| 1,556,438 | Hansen et al. | Oct. 6, 1925 |
| 1,597,961 | Farkas | Aug. 31, 1926 |
| 1,749,262 | Roark | Mar. 4, 1930 |
| 1,872,620 | Cowley et al. | Aug. 16, 1932 |
| 2,062,604 | Paxton | Dec. 1, 1936 |
| 2,699,277 | Martin | Jan. 11, 1955 |
| 2,700,449 | Gleason et al. | Jan. 25, 1955 |
| 3,057,448 | Kornylak | Oct. 9, 1962 |

FOREIGN PATENTS

| | | |
|---|---|---|
| 232,503 | Great Britain | Apr. 23, 1925 |